US011441681B2

(12) United States Patent
Bast et al.

(10) Patent No.: US 11,441,681 B2
(45) Date of Patent: Sep. 13, 2022

(54) METHOD FOR ACTIVATING A PARKING LOCK SYSTEM AND PARKING LOCK SYSTEM

(71) Applicant: Robert Bosch GmbH, Stuttgart (DE)

(72) Inventors: Frank Bast, Tamm (DE); Ingo Drewe, Fehmarn (DE)

(73) Assignee: Robert Bosch GmbH, Stuttgart (DE)

( * ) Notice: Subject to any disclaimer, the term of this patent is extended or adjusted under 35 U.S.C. 154(b) by 25 days.

(21) Appl. No.: 17/050,473

(22) PCT Filed: Mar. 19, 2019

(86) PCT No.: PCT/EP2019/056827
§ 371 (c)(1),
(2) Date: Oct. 26, 2020

(87) PCT Pub. No.: WO2019/206521
PCT Pub. Date: Oct. 31, 2019

(65) Prior Publication Data
US 2021/0239213 A1    Aug. 5, 2021

(30) Foreign Application Priority Data

Apr. 25, 2018   (DE) .................... 10 2018 206 369.9

(51) Int. Cl.
*F16H 63/48* (2006.01)
*B60L 3/00* (2019.01)
(Continued)

(52) U.S. Cl.
CPC .......... *F16H 63/483* (2013.01); *B60L 3/0076* (2013.01); *F16H 59/44* (2013.01); *F16H 2059/366* (2013.01); *F16H 2059/446* (2013.01)

(58) Field of Classification Search
CPC ...... B60L 3/0076; F16H 63/483; F16H 59/44; F16H 2059/366; F16H 2059/446; F16H 63/48
See application file for complete search history.

(56) References Cited

U.S. PATENT DOCUMENTS

| 5,743,348 A | 4/1998 | Coppola et al. |
| 8,770,369 B2* | 7/2014 | Ueno ............... F16H 59/54 |
| | | 192/219.4 |
| 9,371,909 B2* | 6/2016 | MacFarlane ........ F16H 59/44 |

FOREIGN PATENT DOCUMENTS

| CN | 101568455 A | 10/2009 |
| CN | 102365482 A | 2/2012 |

(Continued)

OTHER PUBLICATIONS

International Search Report for Application No. PCT/EP2019/056827 dated Jun. 12, 2019 (English Translation, 2 pages).

*Primary Examiner* — Huan Le
(74) *Attorney, Agent, or Firm* — Michael Best & Friedrich LLP

(57) ABSTRACT

Systems and methods related to activating a parking lock system in the drive train of a vehicle having at least one electrical machine comprising a transmission which is connected to driven wheels. The method includes comparing a rotational speed $n_E$ of the at least one electrical machine with the transmission to a predetermined threshold value for a limiting speed $n_G$, triggering, in the event that the rotational speed $n_E$ is below the threshold value for the limiting speed $n_G$, a command for the actuation of an actuator system for activating the parking lock system, triggering, in the event that the rotational speed $n_E$ exceeds the threshold value for the limiting speed $n_G$, a command for preventing an actua- (Continued)

tion of an actuator system for activating the parking lock system, and miming through a second comparison stage so long as $n_E \geq n_G$.

8 Claims, 1 Drawing Sheet

(51) Int. Cl.
*F16H 59/44* (2006.01)
*F16H 59/36* (2006.01)

(56) References Cited

FOREIGN PATENT DOCUMENTS

| | | |
|---|---|---|
| CN | 106545650 A | 3/2017 |
| DE | 19943519 | 3/2001 |
| DE | 102015111367 | 1/2016 |

* cited by examiner

METHOD FOR ACTIVATING A PARKING LOCK SYSTEM AND PARKING LOCK SYSTEM

BACKGROUND TO THE INVENTION

The invention relates to a method for activating a parking lock system in the drive train of a vehicle with at least one electric motor, with a transmission, which is connected to wheels driven by said electric motor, and to a parking lock system of a vehicle.

Drive trains of motor vehicles which have at least one electric motor are partially electrified. The at least one electric motor is coupled to the driven wheels of the vehicle, wherein the transmission can be immobilized by means of a switchable positive-fit lock in order to prevent the vehicle from rolling away unintentionally. The parking lock function comprises actuating a lock generally automatically (by wire) such that an actuating mechanism, for example a transmission shaft, is immobilized or released by electronic control commands. When a vehicle is moving with residual speed, the parking lock can be engaged such that, when the positive-fit lock is engaged, the rotational movements existing in the drive train are stopped abruptly. The moments of inertia of the vehicle and of the at least one electric motor thus act on the transmission, as a result of which critical elevated torques can occur which can constitute a multiple of the driving torque.

Depending on the expected frequency of the abovedescribed load case, it must be taken into account when designing the transmission, which correspondingly makes the manufacturing costs of such a transmission higher.

The parking lock systems which have been used up until now are moreover equipped with a mechanical prohibiting mechanism which prevents the lock from engaging at higher vehicle speeds for safety reasons. This mechanical prohibiting mechanism is subject to wear when it is active. The vehicle speed is above a threshold value, generally 2 km/h to 5 km/h, when this prohibiting mechanism is actuated.

SUMMARY OF THE INVENTION

According to the invention, a method for activating a parking lock system in the drive train of a vehicle with at least one electric motor with a transmission is proposed, wherein the driven wheels are connected to the electric motor with a transmission and the following method steps are performed:
a) comparing a speed $n_E$ of the at least one electric motor with a transmission with a preset limit speed $n_G$ which represents a threshold value,
b) when the speed $n_E$ falls below the limit speed $n_G$, a control command is triggered to actuate an actuating mechanism for activating the parking lock system,
c) when the speed $n_E$ exceeds the limit speed $n_G$, the triggering of a control command to actuate an actuating mechanism for the parking lock system is prevented,
d) performing a second comparison step as long as $n_E > n_G$ and, if $n_E \leq n_G$, branching to method step b).

By virtue of the solution proposed according to the invention, the critical load cases for the transmission system can be significantly reduced by corresponding control of the parking lock system. As a result, it is no longer necessary to take the load case into consideration separately in the design and the transmission can have a more cost-effective design.

In a development of the method proposed according to the invention, there is a fixed correlation between the speed $n_E$ of the at least one electric motor with a transmission and a speed $v_F$ of the vehicle. This fact is used to be able to determine the speed $n_E$ of the at least one electric motor when the vehicle is moving very slowly much more accurately than when it is evaluated in conventional drive trains which have an internal combustion engine and a manual transmission. In those cases, a calculation is made based on the speeds of the wheels, wherein here the speeds to be observed are also usually higher by an order of magnitude owing to the interposed transmission.

In the solution proposed according to the invention, the speed $n_E$ of the at least one electric motor with a transmission is calculated in an evaluation unit using the vehicle speed.

If the speed $n_E$ of the at least one electric motor exceeds the limit speed $n_G$, the triggering of a control command for actuating the actuating mechanism for activating the parking lock system can be delayed by a period of time $\Delta t$.

In a development of the method proposed according to the invention, the duration of the period of time $\Delta t$ is dependent on the degree by which the limit speed $n_G$ is exceeded by the calculated speed $n_E$ of the at least one electric motor with a transmission in the drive train.

In the method proposed according to the invention, a control command can advantageously be triggered by an evaluation unit to actuate the actuating mechanism for activating the parking lock system in such a way that either a front axle, a rear axle, or both axles, or a drive train is immobilized.

The invention furthermore also relates to a parking lock system for a vehicle with at least one electric motor, with a transmission, which is connected to the wheels of the vehicle, wherein the parking lock system is operated according to one of more claims of the above method.

The parking lock system comprises a switchable positive-fit lock.

In the configuration of vehicles with parking lock systems, the parking lock systems can, for example, be incorporated directly in the at least one electric motor with a transmission, or be associated with the front axle or the rear axle or the drive train in its entirety. The parking lock system comprises a mechanical prohibiting mechanism which effectively prevents the switchable positive-fit lock from engaging at higher vehicle speeds $v_F$.

Advantages of the Invention

By virtue of the solution proposed according to the invention, it can be achieved with respect to the transmission design that it is ensured that the parking lock system is engaged only at vehicle speeds which are close to a standstill. The load case in which the parking lock system is engaged at speeds above 2 km/h is excluded such that such a load case no longer needs to be taken into account in the design of the transmission. Whether the vehicle is close to a standstill can be determined much more accurately by interpreting the speed of the at least one electric motor with a transmission, compared with a calculation in conventional drive trains which is based on wheel speeds. In conventional drive trains which comprise a manual transmission and an internal combustion engine, the wheel speeds are usually greater by an order of magnitude owing to the interposed transmission.

In conventional drive trains, the plausibility of the vehicle speed for engaging the parking lock is checked with the wheel speeds. The latter usually have a wide spread of values, or none at all, at very low vehicle speeds. In order to create a reproducible engagement threshold at the user interface, a significantly higher threshold value must therefore be chosen in the case of conventional drive trains, i.e. with a manual transmission and with an internal combustion engine, which can be avoided by virtue of the solution proposed according to the invention based on the speed of the at least one electric motor with a transmission.

With respect to the resulting advantages for the parking lock system, it should be pointed out that, by virtue of the method proposed according to the invention, the prohibiting mechanism is required only in an emergency, for example in the event of incorrect activation. The demands on the parking lock mechanism can therefore be reduced accordingly because the abovedescribed mechanical loads at higher vehicle speeds are eliminated owing to the method proposed according to the invention.

BRIEF DESCRIPTION OF THE DRAWINGS

The invention is described in greater detail below with the aid of the drawings, in which.

DETAILED DESCRIPTION

Figure 1:
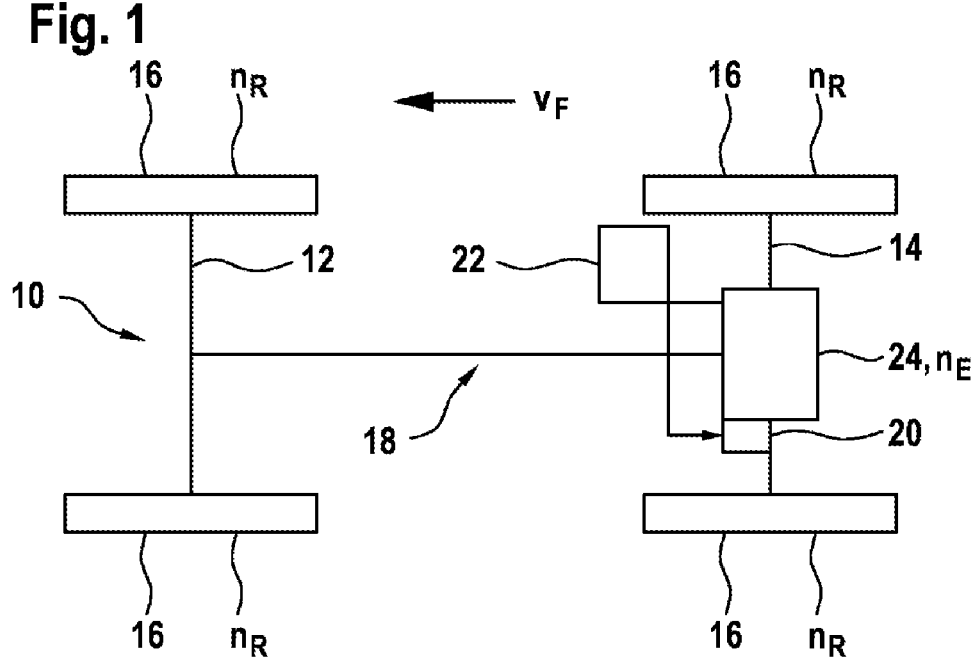
FIG. 1 shows a vehicle with a partially electrified drive train.

A vehicle 10 with a partially electrified drive train 18 can be seen schematically in the view in FIG. 1.

The vehicle 10 comprises a front axle 12 and a rear axle 14. The front axle 12 has respectively two wheels 16, the rear axle 14 has two wheels 16 which are connected to an electric motor 24, with a transmission, integrated into the rear axle 14. The at least one electric motor 24 with a transmission is connected to an evaluation unit 22; a parking lock system 20 is moreover associated with the at least one electric motor 24 with a transmission. It is important that the electric motor 24 is not disconnected from the transmission when the parking lock system 20 is engaged or otherwise the speed $n_E$ of the electric motor 24 with a transmission would not provide any information about the vehicle speed $v_F$ which actually exists.

The vehicle 10 moves at a vehicle speed $v_F$, the speed of the at least one electric motor 24 with a transmission is designated by $n_E$, and a wheel speed of the wheels 16 is designated by $n_R$.

Although not shown explicitly in FIG. 1, the at least one electric motor 24 with a transmission, as well as the parking lock system 20, can also be provided on the front axle 12. In vehicles 10 with a partially electrified drive train 18, an electric motor 24 with a transmission can be provided both on the front axle 12 and on the rear axle 14, respectively.

Figure 2:
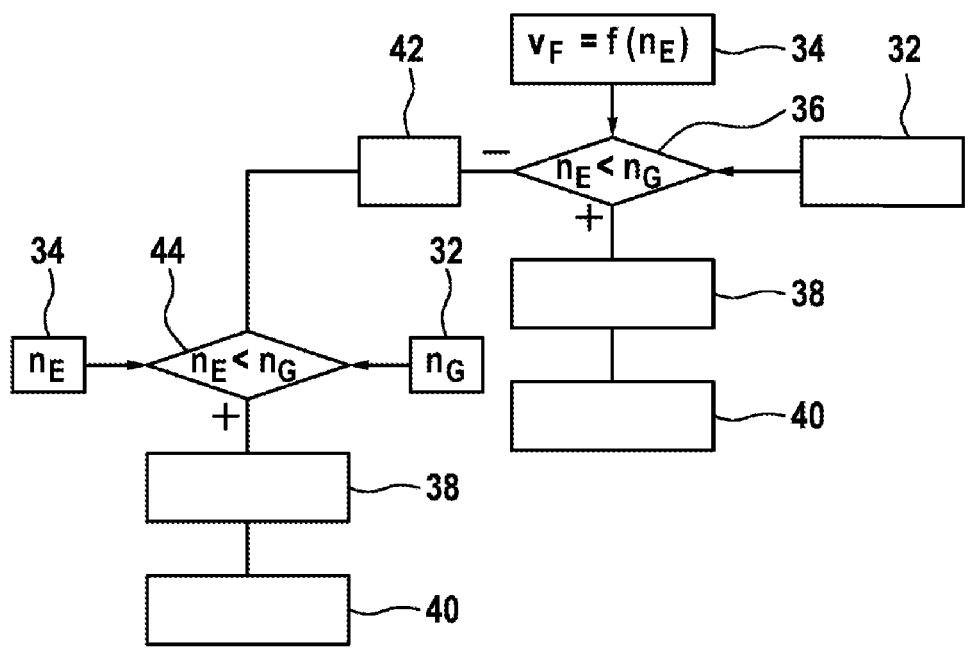
FIG. 2 shows a signal flow diagram which essentially illustrates the method proposed according to the invention.

FIG. 2 shows a signal flow diagram, the purpose of which is to illustrate the essential components of the method proposed according to the invention.

In order to reduce the abovedescribed critical elevated torques, the parking lock system 20 should be engaged only at vehicle speeds $v_F \leq 2$ km/h. First, the speed $n_E$ of the at least one electric motor 24 with a transmission is calculated 34. In the case of the transmissions described here, there is a fixed correlation between the speed $n_E$ of the at least one electric motor 24 with a transmission and the vehicle speed $v_F$ of the vehicle 10, as indicated in FIG. 1. In a first comparison step 36, the calculated speed $n_E$ of the at least one electric motor 24 with a transmission is compared with a threshold value, a limit speed $n_G$. The first comparison step 36 takes place in an evaluation unit 22 which is connected to the at least one electric motor 24 with a transmission. If the calculated speed $n_E$ of the at least one electric motor is above a preset threshold value 32 for the limit speed $n_G$, the activation of the parking lock system 20 is prevented or delayed by a period of time $\Delta t$.

In this case, the triggering of a control command for the actuating system for activating the parking lock system 20 is prevented 42 or delayed.

Otherwise, i.e. when the calculated speed $n_E$ of the at least one electric motor 24 with a transmission falls below the predefined limit speed $n_G$ set as a threshold value, the intention to apply the parking lock from the by wire system is transformed into a control command to activate the parking lock system 20. The threshold value is ideally checked in the evaluation unit 22 which coordinates the parking lock system 20 but could also be implemented in a different control system such as, for example, in a separate parking lock control system.

An activated parking lock system 20 is indicated by the reference numeral 40. In this case, it is ensured that the parking lock system 20 is activated in a gentle fashion for the mechanical components of the parking lock system 20 below a vehicle speed $v_F \leq 2$ km/h.

When it occurs in the first comparison step 36 that the speed $n_E$ of the at least one electric motor is above the limit speed $n_G$ which serves as a threshold value, the triggering of the control commands for the actuating system of the parking lock system 20 is prevented 42. It remains deactivated. The second comparison step 44 runs for as long as $n_E \leq n_G$ and then a control command to actuate the actuating system of the parking lock system 20 takes place so that the latter is activated.

After a period of time $\Delta t$ has expired, it is also alternatively possible in a second comparison step 44 for a comparison to be made again between the calculated speed $n_E$ of the at least one electric motor 24 with a transmission and the limit speed $n_G$ which serves as a threshold value. The period of time $\Delta t$ can be chosen depending on the degree by which the speed $n_E$ exceeds the limit speed $n_G$. The period of time $\Delta t$ can be short when the limit speed $n_G$ is exceeded by a relatively small amount but can be longer when the amount by which the calculated speed $n_E$ of the at least one electric motor 24 with a transmission exceeds the limit speed $n_G$ is greater.

In this alternative embodiment, a control command for the actuating system to actuate the parking lock system 20 is then also triggered 38. This is activated at position 40, wherein the criterion for applying the parking lock system 20, that the vehicle speed $v_F$ is below 2 km/h, is taken into account.

By virtue of the method proposed according to the invention, the abovementioned load cases which damage the mechanical components are eliminated both for the mechanical components of the transmission and the mechanical prohibiting system for preventing the application of the parking lock system 20. The parking lock system 20, which can be associated with the rear axle 14, the partially electrified drive train 18, and the front axle 12 is designed without taking account of these load cases. The prohibiting mechanism can also be designed more simply. The demands on the parking lock mechanism can consequently also be correspondingly reduced so that a more favorable and affordable design of said components, i.e. of the parking lock system 20 and the transmission associated with the electric motor 24, results.

The invention is not limited to the exemplary embodiments described here and the aspects highlighted therein. Instead, numerous variations known to a person skilled in the art are possible within the scope defined by the claims.

The invention claimed is:

1. A method for activating a parking lock system (20) in a drive train (18) of a vehicle (10) with at least one electric motor (24), with a transmission, which is connected to driven wheels (16), the method comprising:
   a) comparing a speed $n_E$ of the at least one electric motor (24) with the transmission with a preset limit speed $n_G$ which represents a threshold value,
   b) when the speed $n_E$ falls below the limit speed $n_G$, triggering a control command to actuate an actuating mechanism for activating the parking lock system (20),
   c) when the speed nE exceeds the limit speed $n_G$, preventing triggering of the control command to actuate the actuating mechanism for activating the parking lock system (20), and
   d) performing a second comparison step (44) as long as $n_E > n_G$ and, if $n_E < n_G$, branching to method step b)

wherein if the speed $n_E$ of the at least one electric motor (24) with the transmission exceeds the limit speed $n_G$, the triggering of a control command for actuating the actuating mechanism for activating the parking lock system (20) is delayed by a period of time $\Delta t$.

2. The method as claimed in claim 1, wherein there is a fixed correlation between the speed nE of the at least one electric motor (24) with the transmission and a speed $v_F$ of the vehicle (10).

3. The method as claimed in claim 1, wherein the speed nE of the at least one electric motor (24) with the transmission is calculated in an evaluation unit (22) using the vehicle speed $v_F$ or a speed of the transmission.

4. The method as claimed in claim 1, wherein the duration of the period of time $\Delta t$ is dependent on a degree by which the limit speed $n_G$ is exceeded by the calculated speed $n_E$ of the at least one electric motor (24) with a transmission.

5. The method as claimed in claim 1, wherein the control command is triggered to actuate the actuating mechanism for activating the parking lock system (20) in such a way that a front axle (12), a rear axle (14), or the drive train (18) is immobilized.

6. The parking lock system (20) for a vehicle (10) with at least one electric motor (24), with a transmission, which is connected to the wheels (16) of the vehicle (10), wherein the parking lock system (20) is operated according to the method as claimed in claim 1, wherein the parking lock system (20) comprises a switchable positive-fit lock.

7. The parking lock system (20) as claimed in claim 6, wherein the parking lock system (20) is associated with a front axle (12), a rear axle (14), or a drive train (18) of the vehicle (10).

8. The parking lock system (20) as claimed in claim 6, wherein the parking lock system comprises a mechanical prohibiting mechanism which prevents the switchable positive-fit lock from engaging at a higher vehicle speed $v_F$·s.

* * * * *